(12) United States Patent
Sano et al.

(10) Patent No.: US 10,428,180 B2
(45) Date of Patent: Oct. 1, 2019

(54) POLYAMIDE RESIN AND MOLDED ARTICLE CONTAINING SAME

(71) Applicant: UBE INDUSTRIES, LTD., Ube-shi, Yamaguchi (JP)

(72) Inventors: Hideo Sano, Ube (JP); Keitarou Ono, Ube (JP); Atsushi Yamashita, Ube (JP)

(73) Assignee: UBE INDUSTRIES, LTD., Ube-shi, Yamaguchi (JP)

( * ) Notice: Subject to any disclaimer, the term of this patent is extended or adjusted under 35 U.S.C. 154(b) by 0 days.

(21) Appl. No.: 15/315,584

(22) PCT Filed: Jun. 2, 2015

(86) PCT No.: PCT/JP2015/065861
§ 371 (c)(1),
(2) Date: Dec. 1, 2016

(87) PCT Pub. No.: WO2015/186689
PCT Pub. Date: Dec. 10, 2015

(65) Prior Publication Data
US 2017/0198094 A1    Jul. 13, 2017

(30) Foreign Application Priority Data

Jun. 2, 2014   (JP) ................................ 2014-114214

(51) Int. Cl.
| | |
|---|---|
| C08G 69/14 | (2006.01) |
| B32B 27/34 | (2006.01) |
| B65D 65/40 | (2006.01) |
| C08J 5/18 | (2006.01) |
| C08G 69/00 | (2006.01) |
| D01F 6/60 | (2006.01) |
| C08G 69/08 | (2006.01) |
| C08G 69/16 | (2006.01) |
| D01F 6/80 | (2006.01) |
| B32B 7/12 | (2006.01) |
| B32B 27/08 | (2006.01) |
| B32B 27/30 | (2006.01) |
| B32B 27/32 | (2006.01) |

(52) U.S. Cl.
CPC ............... *C08G 69/14* (2013.01); *B32B 7/12* (2013.01); *B32B 27/08* (2013.01); *B32B 27/306* (2013.01); *B32B 27/32* (2013.01); *B32B 27/34* (2013.01); *B65D 65/40* (2013.01); *C08G 69/00* (2013.01); *C08G 69/08* (2013.01); *C08G 69/16* (2013.01); *C08J 5/18* (2013.01); *D01F 6/60* (2013.01); *D01F 6/80* (2013.01); *B32B 2307/514* (2013.01); *B32B 2307/581* (2013.01); *B32B 2307/736* (2013.01); *B32B 2307/738* (2013.01); *B32B 2439/70* (2013.01); *C08J 2377/02* (2013.01)

(58) Field of Classification Search
CPC ....... C08L 77/00; C08L 77/02; C08G 69/265; C08G 81/028; B32B 2262/0261
See application file for complete search history.

(56) References Cited

U.S. PATENT DOCUMENTS

| | | | |
|---|---|---|---|
| 3,687,904 A | 8/1972 | Middleton | |
| 4,417,032 A * | 11/1983 | Khanna ................ | C08G 69/265 524/147 |
| 4,431,705 A | 2/1984 | Kitagawa et al. | |
| 5,723,569 A | 3/1998 | Sato et al. | |
| 6,169,161 B1 | 1/2001 | Tachibana et al. | |
| 2001/0027230 A1* | 10/2001 | Urabe ........................ | C08J 5/18 524/447 |
| 2006/0071359 A1 | 4/2006 | Monsheimer et al. | |
| 2013/0078402 A1* | 3/2013 | Mitadera ................ | C08G 69/26 428/36.9 |

FOREIGN PATENT DOCUMENTS

| | | |
|---|---|---|
| EP | 1170328 A1 | 1/2002 |
| JP | 52-77187 A | 6/1977 |
| JP | 54-39035 B2 | 11/1979 |
| JP | 57-170749 A | 10/1982 |
| JP | 9-77865 A | 3/1997 |
| JP | 10-280229 A | 10/1998 |
| JP | 11-71455 A | 3/1999 |
| JP | 11-343341 A | 12/1999 |
| JP | 2000-95937 A | 4/2000 |
| JP | 2002-248721 A | 9/2002 |
| JP | 2006-111762 A | 4/2006 |
| JP | 2006-111763 A | 4/2006 |
| TW | 200626640 A | 8/2006 |

OTHER PUBLICATIONS

International Search Report for PCT/JP2015/065861 (PCT/ISA/210) dated Aug. 11, 2015.
European Patent Office Communication and Search Report issued in the corresponding European Patent Application No. 15802726.8 dated Dec. 1, 2017.
Taiwanese Office Action and Search Report, dated Oct. 22, 2018, for Taiwanese Application No. 104117787.
Japanese Office Action for Japanese Application No. 2015-111929, dated Jun. 11, 2019, with an English translation.

* cited by examiner

*Primary Examiner* — Gregory Listvoyb

(74) *Attorney, Agent, or Firm* — Birch, Stewart, Kolasch & Birch, LLP

(57) ABSTRACT

The present invention relates to a polyamide resin comprising a unit derived from ε-caprolactam and/or ε-aminocaproic acid (to also be referred to as "Unit 1"), a unit derived from adipic acid (to also be referred to as "Unit 2") and a unit derived from hexamethylenediamine (to also be referred to as "Unit 3"), wherein the concentration of terminal amino groups in the polyamide resin is greater than the concentration of terminal carboxyl groups in the polyamide resin, and the amount of Unit 1 is greater than 60% by weight to less than 80% by weight of the total amount of Unit 1, Unit 2 and Unit 3.

12 Claims, No Drawings

POLYAMIDE RESIN AND MOLDED ARTICLE CONTAINING SAME

TECHNICAL FIELD

The present invention relates to a polyamide resin and a molded article containing that polyamide resin.

BACKGROUND ART

Polyamide resins, exemplified by polyamide 6, polyamide 66 and polyamide 12, have superior heat resistance and moldability, and are therefore used as raw materials of molded articles such as food packaging films.

Patent Document 1 describes a deep-drawn packaging film comprising a single-layer or multilayer polyamide film having at least one polyamide layer, wherein the polyamide layer is obtained by copolymerizing 50% by weight to 90% by weight of a component (A) selected from ε-caprolactam and ε-aminocaproic acid, and a total amount of 10% by weight to 50% by weight of a component (B) selected from 12-aminododecanoic acid and co-laurolactam, and equimolar amounts of components (C) consisting of hexamethylenediamine and adipic acid (total amount of components B and C) such that the copolymer contains the three components of components A, B and C and the total amount of the three components is 100% by weight. In addition, Patent Document 2 describes a single-layer or multilayer polyamide film having at least one polyamide layer, wherein the polyamide layer is the aforementioned polyamide and is produced by water-cooled inflation molding.

PRIOR ART DOCUMENTS

Patent Documents

Patent Document 1: Japanese Unexamined Patent Publication No. 2006-111762
Patent Document 2: Japanese Unexamined Patent Publication No. 2006-111763

DISCLOSURE OF THE INVENTION

Problems to be Solved by the Invention

Although the polyamide film described in Patent Document 1 has superior deep-drawing moldability in addition to superior oxygen gas impermeability and puncture resistance, and the polyamide film described in Patent Document 2 has large hot water shrinkage and superior shrinkability in addition to superior oxygen impermeability and puncture resistance, there are cases in which they are inadequate depending on the application and object being packaged. In addition, according to research conducted by the inventors of the present invention, there were cases in which a monofilament that used the polyamides described in Patent Document 1 and Patent Document 2 demonstrated inadequate knot strength, transparency and moldability. An object of the present invention is to provide a polyamide resin that imparts a molded article having more superior shrinkability, piercing strength following heat-moisture treatment and deep drawability of a film and knot strength, transparency, tensile strength following heat-moisture treatment and moldability of a monofilament.

Means for Solving the Problems

As a result of conducting extensive studies to solve the aforementioned problems, the inventors of the present invention found that, in the case of using a polyamide resin, containing specific amounts of a unit derived from a caprolactam and/or an aminocaproic acid, a unit derived from adipic acid, and a unit derived from hexamethylenediamine, wherein the concentration of terminal amino groups is greater than the concentration of terminal carboxyl groups, as a raw material of a molded article, the resulting film has more superior shrinkability, piercing strength after heat-moisture treatment and deep drawability, and the resulting monofilament has more superior knot strength, transparency and moldability, thereby leading to completion of the present invention.

The gist of the present invention is as indicated below.

Invention 1 relates to a polyamide resin comprising a unit derived from ε-caprolactam and/or ε-aminocaproic acid (to also be referred to as "Unit 1"), a unit derived from adipic acid (to also be referred to as "Unit 2") and a unit derived from hexamethylenediamine (to also be referred to as "Unit 3"), wherein the concentration of terminal amino groups in the polyamide resin is greater than the concentration of terminal carboxyl groups in the polyamide resin, and the amount of Unit 1 is greater than 60% by weight to less than 80% by weight of the total amount of Unit 1, Unit 2 and Unit 3.

Invention 2 relates to the polyamide resin of Invention 1, which does not comprise a unit derived from a component selected from 12-aminododecanoic acid and ω-laurolactam.

Invention 3 relates to the polyamide resin of Invention 1 or Invention 2, consisting of a unit derived from ε-caprolactam and/or ε-aminocaproic acid (to also be referred to as "Unit 1"), a unit derived from adipic acid (to also be referred to as "Unit 2") and a unit derived from hexamethylenediamine (to also be referred to as "Unit 3").

Invention 4 relates to the polyamide resin of any one of Inventions 1 to 3, wherein relative viscosity (ηr) of the polyamide resin measured in 96% by weight of sulfuric acid under conditions of a polyamide concentration of 1% by weight and temperature of 25° C. is 3.4 or more.

Invention 5 relates to the polyamide resin of any one of Inventions 1 to 4, wherein the concentration of terminal amino groups is $2.30 \times 10^{-5}$ eq/g to $3.30 \times 10^{-5}$ eq/g.

Invention 6 relates to the polyamide resin of any one of Inventions 1 to 5, wherein the concentration of terminal carboxyl groups is $2.00 \times 10^{-5}$ eq/g to $3.00 \times 10^{-5}$ eq/g.

Invention 7 relates to the polyamide resin of any one of Inventions 1 to 6, wherein the difference between the concentration of terminal amino groups and the concentration of terminal carboxyl groups is $0.05 \times 10^{-5}$ eq/g to $1.0 \times 10^{-5}$ eq/g.

Invention 8 relates to a molded article comprising the polyamide resin of any one of Inventions 1 to 7.

Invention 9 relates to a non-stretched film comprising the polyamide resin of any one of Inventions 1 to 7.

Invention 10 relates to a stretched film obtained by stretching the non-stretched film of Invention 9.

Invention 11 relates to the non-stretched film of Invention 9 which is a food packaging film.

Invention 12 relates to the stretched film of Invention 10 which is a food packaging film.

Invention 13 relates to a non-stretched multi-layered film comprising the non-stretched film of Invention 9.

Invention 14 relates to a stretched multi-layered film comprising the stretched film of Invention 10.

Invention 15 relates to a polyamide monofilament comprising the polyamide resin of any one of Inventions 1 to 7.

Effects of the Invention

According to the present invention, a polyamide resin is provided that imparts a molded article having more superior shrinkability, piercing strength following heat-moisture treatment and deep drawability of a film and more superior knot strength, transparency, tensile strength following heat-moisture treatment and moldability of a monofilament.

BEST MODE FOR CARRYING OUT THE INVENTION

In the present description, the term "step" not only includes an independent step, but also includes that which allows an anticipated objective of that step to be achieved even in the case it cannot be clearly distinguished from other steps. In addition, a range of numerical values indicated using the symbol "-(to)" indicates a range that includes those numerical values indicated before and after the "-(to)" symbol as the respective minimum and maximum values. Moreover, the contents of each component in a composition refer to the total amount of a plurality of substances corresponding to each component present in the composition in the case a plurality of the substances are present in the composition unless specifically indicated otherwise.

[Polyamide Resin]

The polyamide resin is a polyamide resin that contains a unit derived from ε-caprolactam and/or ε-aminocaproic acid (to also be referred to as "Unit 1"), a unit derived from adipic acid (to also be referred to as "Unit 2") and a unit derived from hexamethylenediamine (to also be referred to as "Unit 3"), wherein the concentration of terminal amino groups in the polyamide resin is greater than the concentration of terminal carboxyl groups in the polyamide resin, and the amount of Unit 1 is greater than 60% by weight to less than 80% by weight of the total amount of Unit 1, Unit 2 and Unit 3.

The content of Unit 1 based on the total amount of Unit 1, Unit 2 and Unit 3 is greater than 60% by weight to less than 80% by weight, preferably 62% by weight to 78% by weight, and more preferably 65% by weight to 75% by weight. If the content of Unit 1 is 80% by weight or more, either film shrinkability or deep drawability is inferior. In addition, if the content of Unit 1 is 80% by weight or more, adequate monofilament knot strength is unable to be obtained and transparency is inferior. On the other hand, if the content of Unit 1 is 60% by weight or less, film piercing strength, and particularly piercing strength after heat-moisture treatment, is inferior. In addition, monofilament tensile strength decreases considerably and is not practical. If the content of Unit 1 is 62% or more, piercing strength tends to be improved more, and if the content of Unit 1 is 78% or less, shrinkability and deep drawability tend to be improved more. In addition, if the content of unit 1 is within this range, a monofilament can be expected to be obtained that demonstrates high knot strength.

There are no particular limitations on the contents of Unit 2 and Unit 3. The content of Unit 2 is preferably 45 mol % to 55 mol %, more preferably 47 mol % to 53 mol %, even more preferably 49 mol % to 51 mol %, and particularly preferably 50 mol %, based on the total number of moles of Unit 2 and Unit 3. Namely, Unit 2 and Unit 3 are particularly preferably present in equimolar amounts.

The polyamide resin may further contain a unit derived from a raw material of a polyamide resin other than Unit 1, Unit 2 and Unit 3 provided it does not impair the effects of the present invention (to be referred to as "Other Unit"). There are no particular limitations on other raw material of polyamide resins, and examples thereof include lactams, aminocarboxylic acids, salts of diamines and dicarboxylic acids (nylon salts) and mixtures of diamines and oxalate diesters. Other raw materials of polyamide resins do not include ε-caprolactam, ε-aminocaproic acid, adipic acid and hexamethylenediamine.

Examples of lactams include ω-enantholactam, ω-undecalactam, ω-laurolactam, α-pyrrolidone and α-piperidone.

Examples of aminocarboxylic acids include aliphatic ω-aminocarboxylic acids such as 7-aminoheptanoic acid, 8-aminooctanoic acid, 9-aminononanoic acid, 10-aminocaproic acid or 11-aminoundecanoic acid.

Examples of dicarboxylic acids include aliphatic dicarboxylic acids such as oxalic acid, malonic acid, succinic acid, glutaric acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid or eicosadecanedioic acid, alicyclic dicarboxylic acids such as 1,3- or 1,4-cyclohexanedicarboxylic acid, cyclohexanemethane-4,4'-dicarboxylic acid or norbornane dicarboxylic acid, and aromatic dicarboxylic acids such as isophthalic acid, terephthalic acid, 1,4-, 1,8-, 2,6- or 2,7-naphthalenedicarboxylic acid.

Examples of oxalate diesters include oxalate diesters of aliphatic alcohols such as dimethyl oxalate, diethyl oxalate, di-n- (or i-) propyl oxalate or di-n- (i- or t-) butyl oxalate, oxalate diesters of alicyclic alcohols such as dicyclohexyl oxalate, and oxalate diesters of aromatic alcohols such as diphenyl oxalate.

Examples of diamines are as exemplified in the section on polymerization regulators to be subsequently described, with the exception of hexamethylenediamine.

The polyamide resin preferably does not contain a unit derived from 12-aminododecanoic acid or ω-laurolactam, and more preferably does not contain other units. In the case the polyamide resin does not contain a unit derived from 12-aminodecanoic acid or ω-laurolactam, the oxygen permeability coefficient of a molded article of the polyamide resin tends to be lower. In addition, in the case the polyamide resin does not contain other units, the polyamide resin tends to be able to be produced more easily.

The polyamide resin may have a unit derived from a polymerization regulator able to be used in the production of polyamide resins. Examples of polymerization regulators include aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, octadecamethylenediamine, nonadecamethylenediamine, eicosamethylenediamine, 2- or 3-methyl-1,5-pentanediamine, 2-methyl-1,8-octanediamine, 2,2,4- or 2,4,4-trimethyl-1,6-hexanediamine or 5-methyl-1,9-nonanediamine, alicyclic diamines such as 1,3- or 1,4-cyclohexanedimethylamine, bis(4-aminocyclohexyl)methane, bis(4-aminocyclohexyl)propane, bis(3-methyl-4-aminocyclohexyl)methane, bis(3-methyl-4-aminocyclohexyl)propane, 5-amino-2,2,4-trimethyl-1-cyclopentanemethylamine, 5-amino-1,3,3-trimethylcyclohexanemethylamine (isophoronediamine), bis(aminopropyl)piperazine, bis(aminoethyl)piperazine, norbornanedimethylamine or tricyclodecanedimethylamine, and aromatic diamines such as m- or p-xylylenediamine. These may be used alone or two or more types may be used in combination.

The content of Unit 1, Unit 2 and Unit 3 in the case a unit derived from a polymerization regulator is not present in the polyamide resin, or the content of Unit 1, Unit 2, Unit 3 and a unit derived from the polymerization regulator in the case a unit derived from a polymerization regulator is present in the polyamide resin is, without particular limitation, preferably 95% by weight or more, more preferably 99% by weight or more and even more preferably 100% by weight. Furthermore, the content of other units in the polyamide resin is the value obtained by subtracting the aforementioned content of Unit 1, Unit 2 and Unit 3 or the content of Unit 1, Unit 2, Unit 3 and the unit derived from a polymerization regulator from 100% by weight.

The content of the unit derived from a polymerization regulator in the polyamide resin is, without particular limitation, preferably 120 ppm to 970 ppm and more preferably 120 ppm to 690 ppm based on the total amount of Unit 1, Unit 2 and Unit 3. Furthermore, in the case the polymerization regulator is hexamethylenediamine, the content of the unit derived from hexamethylenediamine used as a polymerization regulator is added to the content of Unit 3.

The content of each unit in the polyamide resin can be measured using gas chromatography after having hydrolyzed the polyamide resin with hydrochloric acid followed by subjecting to esterification and iminization treatment. Furthermore, the content ratio of each unit in the raw material components of each unit in the polyamide resin is roughly equal.

Accordingly, a polyamide containing Unit 1, Unit 2 and Unit 3 but not containing 12-aminododecanoic acid or ω-laurolactam and/or a polyamide resin containing Unit 1, Unit 2, Unit 3 and a unit derived from a polymerization regulator but not containing 12-aminododecanoic acid or ω-laurolactam is preferable, and a polyamide resin containing Unit 1, Unit 2 and Unit 3 and/or a polyamide resin containing Unit 1, Unit 2, Unit 3 and a unit derived from a polymerization regulator (namely, a polyamide resin containing Unit 1, Unit 2 and Unit 3 but does not contain another unit and/or a polyamide resin containing Unit 1, Unit 2, Unit 3 and a unit derived from a polymerization regulator but does not contain another unit) is particularly preferable.

[Terminal Group Concentrations]

The concentration of terminal amino groups is greater than the concentration of terminal carboxyl groups in the polyamide resin. If the concentration of terminal amino groups is equal to or less than the concentration of terminal carboxyl groups, piercing strength following heat-moisture treatment decreases.

There are no particular limitations on the concentration of terminal amino groups in the polyamide resin of the present invention provided it is greater than the concentration of terminal carboxyl groups in the polyamide resin of the present invention. From the viewpoints of film piercing strength and monofilament tensile strength following heat-moisture treatment, the concentration of terminal amino groups is preferably $2.30 \times 10^{-5}$ eq/g to $3.30 \times 10^{-5}$ eq/g and more preferably $2.50 \times 10^{-5}$ eq/g to $3.00 \times 10^{-5}$ eq/g. In addition, there are no particular limitations on the concentration of terminal carboxyl groups in the polyamide resin of the present invention provided it is less than the concentration of terminal amino groups in the polyamide resin of the present invention. From the viewpoints of piercing strength and tensile strength following heat-moisture treatment, the concentration of terminal carboxyl groups is preferably $2.00 \times 10^{-5}$ eq/g to $3.00 \times 10^{-5}$ eq/g and more preferably $2.20 \times 10^{-5}$ eq/g to $2.80 \times 10^{-5}$ eq/g. From the viewpoints of piecing strength and tensile strength following heat-moisture treatment, the difference between the concentration of terminal amino groups and the concentration of terminal carboxyl groups in the polyamide resin of the present invention is preferably $0.05 \times 10^{-5}$ eq/g to $1.0 \times 10^{-5}$ eq/g, more preferably $0.10 \times 10^{-5}$ eq/g to $0.70 \times 10^{-5}$ eq/g, and even more preferably $0.10 \times 10^{-5}$ eq/g to $0.50 \times 10^{-5}$ eq/g.

The concentration of terminal amino groups can be measured by dissolving the polyamide resin in a mixed solution of phenol and methanol followed by titrating with 0.05 N hydrochloric acid. In addition, the concentration of terminal carboxyl groups can be measured by dissolving the polyamide resin in benzyl alcohol followed by titrating with 0.05 N sodium hydroxide.

[Relative Viscosity]

The relative viscosity of the polyamide resin when measured in compliance with HS K-6920 in 96% by weight of sulfuric acid under conditions of a polyamide concentration of 1% by weight and temperature of 25° C. is preferably 3.4 or more, more preferably 3.4 to 5.0 and even more preferably 4.0 to 4.8. If relative viscosity is 3.4 or more, viscosity when melting the polyamide resin is suitable, molding is easy, and favorable mechanical properties can be imparted to molded articles containing the polyamide resin.

(Melting Point)

Although there are no particular limitations on the melting point of the polyamide resin, it is preferably higher than 173° C. and lower than 192° C. and more preferably 174° C. to 191° C. If the melting point is higher than 173° C., piercing strength tends to improve, while if the melting point is lower than 192° C., shrinkability and deep drawability tend to improve. Melting point can be measured by differential scanning calorimetry (DSC).

(Polyamide Resin Production Method)

The polyamide resin can be obtained by polymerizing by a known polymerization method such as melt polymerization, solution polymerization or solid-phase polymerization using raw materials consisting of ε-caprolactam, ε-aminocaproic acid, adipic acid, hexamethylenediamine, and depending on the case, other raw materials of the polyamide resin. Here, a salt consisting of 50 mol % hexamethylenediamine and 50 mol % adipic acid (AH salt) can also be used for the adipic acid and hexamethylenediamine raw materials. Since there are cases in which volatilization, reaction and so forth of the raw materials vary according to the production method and production device, it is preferable to adjust the amount of the raw material of each unit so that the polyamide resin has the previously described contents of Unit 1, Unit 2 and Unit 3 in the polyamide resin.

A polymerization regulator may be used during polymerization. The use of a polymerization regulator makes it possible to adjust the concentration of terminal amino groups and concentration of terminal carboxyl groups of the polyamide resin. Since there are cases in which volatilization, reaction and so forth of the polymerization regulator vary according to the production method and production device, the amount of polymerization regulator is preferably adjusted to the previously described content of the unit derived from the polymerization regulator in the polyamide resin.

In addition, a catalyst (such as phosphoric acid, phosphorous acid, hypophosphorous acid or a salt thereof) may be used during polymerization. The pressure during polymerization may be normal pressure, increased pressure, decreased pressure or a combination thereof.

There are no particular limitations on the polyamide resin production device, and examples thereof include a batch-type reaction tank, single-tank or multi-tank continuous reaction device, tubular continuous reaction device and kneading reactive extruder such as a single-screw kneading extruder or twin-screw kneading extruder.

[Polyamide Resin Composition]

When using the polyamide resin, additives may be used in combination therewith provided the effects of the present invention are not impaired. Accordingly, the present invention also relates to a polyamide resin composition containing polyamide resin (to also be simply referred to as the "polyamide resin composition"). The polyamide resin composition is preferably a polyamide resin composition for producing a molded article, and is more preferably a polyamide resin composition for producing a film (polyamide resin composition for film).

The polyamide resin composition of the present invention may also contain an additive or thermoplastic resin other than the polyamide resin of the present invention provided the effects of the present invention are not impaired. There are no particular limitations on the additive provided it is a component that is normally contained in polyamide resin compositions for producing a molded article, and examples thereof include a thermal stabilizer, antioxidant, ultraviolet absorber, weathering agent, lubricant, filler, nucleating agent, plasticizer, foaming agent, anti-blocking agent, antifogging agent, flame retardant, colorant (such as a pigment or dye), stabilizer and coupling agent. These can be suitably selected according to the objective.

The content of the polyamide resin of the present invention in the polyamide resin composition is preferably 50% by weight to 100% by weight, more preferably 70% by weight to 100% by weight and particularly preferably 90% by weight to 100% by weight. If the content of the polyamide resin of the present invention is 50% by weight or more, the polyamide resin composition is able to demonstrate the properties of the polyamide resin. Furthermore, the content of additives and thermoplastic resin other than the polyamide resin of the present invention within the entire polyamide resin composition is the value obtained by subtracting the aforementioned polyamide resin content from 100% by weight.

Accordingly, the present invention is a polyamide resin composition composed of a polyamide resin and additives, wherein the content of polyamide resin in the polyamide resin composition is preferably 50% by weight to 100% by weight.

The polyamide resin composition can be prepared by melting and kneading each component. There are no particular limitations on the melting and kneading method, and can be carried out using a kneading machine such as a single-screw extruder, twin-screw extruder, kneader or Banbury mixer. In addition, each component may also be mechanically blended with a blender and the like.

[Molded Article Containing Polyamide Resin]

The molded article containing polyamide resin is a molded article composed of a polyamide resin or a molded article composed of a polyamide resin composition. The polyamide resin and polyamide resin composition can be molded into a molded article by a molding processing method such as injection, extrusion or press molding. A molded article containing polyamide resin can be used in conventional applications of polyamide resin or polyamide resin composition molded articles. Examples of molded articles include automobile members, computers and related equipment, optical equipment members, electrical and electronic equipment, telecommunication equipment, precision machinery, civil engineering and construction supplies, medical supplies, household supplies and a wide range of other molded article applications as well as monofilament, fibers and film, with film and monofilament being preferable. In the case the molded article is a film, the film has preferable shrinkability, piercing strength after heat-moisture treatment and deep drawability. In addition, in the case the molded article is a monofilament, the monofilament has knot strength, transparency and moldability. The following provides an explanation of preferred embodiments of the present invention in the form of a film containing a polyamide resin (to also be simply referred to as the "polyamide film") and monofilament containing a polyamide resin (to also be simply referred to as the "polyamide monofilament").

(Polyamide Film)

Examples of film containing polyamide resin include a film composed of polyamide resin and a film composed of a polyamide resin composition, and a film composed of a polyamide resin is preferable. The polyamide film containing a polyamide resin may be a non-stretched polyamide film or a stretched polyamide film obtained by stretching the aforementioned non-stretched polyamide film.

<Non-Stretched Polyamide Film>

The non-stretched polyamide film is obtained by a known film production method using a polyamide resin or polyamide resin composition. Examples of known film production methods include T-die molding, air-cooled inflation molding and water-cooled inflation molding. The produced film is a substantially non-oriented, non-stretched film.

<<Properties of Non-Stretched Polyamide Film>>

Although there no particular limitations thereon, draw depth of the non-stretched polyamide film is preferably greater than 50.0 mm, more preferably greater than 50.0 mm to less than 75.0 mm, even more preferably 52.0 mm to 74.0 mm and particularly preferably 60.0 mm to 72.5 mm. If draw depth exceeds 50.0 mm, moldability improves, and as a result thereof, large-volume and large-sized foods can be deep-draw packaged while also being able to accommodate a diverse range of molds.

Although there are no particular limitations thereon, the oxygen permeability coefficient of the non-stretched polyamide film is preferably less than 31.0 cc/m$^2$·day·atm, more preferably greater than 26.0 cc/m$^2$·day·atm to 30.0 cc/m$^2$·day·atm, and even more preferably 27.0 cc/m$^2$·day·atm to 28.0 cc/m$^2$·day·atm. If the oxygen permeability coefficient of the non-stretched polyamide film is less than 31.0 cc/m$^2$·day·atm, the permeation of oxygen, which is a major cause of food oil deterioration and discoloration, mold growth and putrefaction by aerobic microorganisms, can be efficiently blocked.

<Stretched Polyamide Film>

The stretched polyamide film is obtained by a known film stretching method using the non-stretched polyamide film. Furthermore, in the production of the stretched polyamide film, a stretching method may be carried out in succession following production of the non-stretched polyamide film, or a stretching method may be carried out as a separate step after the non-stretched polyamide film is be produced and wound into a roll.

There are no particular limitations on the stretching method, and examples thereof include uniaxial stretching with a heating roller, simultaneous biaxial stretching using a tubular method, and successive biaxial stretching with a heating roller and tenter frame. There are no particular limitations on the temperature of the heating roller, the temperature can be within the range of 50° C. to 130° C., and can be suitably selected corresponding to the material of the polyamide film and target draw ratio. Draw ratio refers to the draw ratios of the direction in which the film is extruded (machine direction, MD) and the direction perpendicular to the machine direction of the film (transverse direction, TD). There are no particular limitations on the draw ratio of the film in the machine direction, and is preferably 2 times or more, more preferably 2 to 6 times, and particularly preferably 2.5 to 5 times. There are also no particular limitations on the draw ratio of the film in the transverse direction, and is preferably 2 times or more, more preferably 2 to 6 times, and even more preferably 2.5 to 5 times. Draw ratio can be adjusted corresponding to the objective.

<<Properties of Stretched Polyamide Film>>

Shrinkability of the stretched polyamide film is such that heat shrinkage as determined by a hot water shrinkage test in which the film is treated for 1 minute at 90° C. is preferably 40% or more, more preferably 41% to 60%, and particularly preferably 42% to 55%. If heat shrinkage is 40% or more, in the case of packaging foods by shrink-wrapping, adhesiveness between the food and film can be increased, and the presence of voids between the food and film tends to be able to be reduced to an extremely low level. If voids are present between the food and film, there is the potential for deterioration of the food to be accelerated by air present in the voids. Heat shrinkage of 40% or more makes it difficult for voids to form between the food and film even in the case of irregularly shaped foods in particular (such as crab or lobster).

If the draw ratio of the stretched polyamide film is large, heat shrinkage also tends to become large. Accordingly, the aforementioned heat shrinkage of the stretched polyamide film is preferably the heat shrinkage of a stretched polyamide film in which the draw ratios in the machine direction and transverse direction of the film are 2.5 times to 4.0 times (2.5×2.5 times to 4.0×4.0 times), respectively, and more preferably the heat shrinkage of a stretched polyamide film in which the draw ratios in the machine direction and transverse direction of the film are 3.0×3.0 times to 3.5×3.5 times, respectively.

Shrinkability can be measured according to the method described in section "5)" of the examples to be subsequently described.

Piercing strength of the stretched polyamide film following heat-moisture treatment consisting of treating for 10 days in a constant temperature, constant humidity chamber set to 80° C. and 90% RH is preferably 12 N or more and more preferably 12 N to 14 N. If the piercing strength of the stretched film is less than 12 N, there is the possibility of the film being punctured by protruding portions of a food such as in the case of shrink-wrapping crab, shrimp or lobster. Furthermore, there are no particular limitations on the piercing strength of the stretched polyamide film in the case of not having undergone heat treatment immediately after production, and can be 12 N or more and preferably 13 N to 15 N.

<Thickness>

There are no particular limitations on the thickness of the polyamide film, and can be suitably selected corresponding to the application. In the case of a single-layer film composed of the polyamide film, the thickness of the polyamide film is preferably 10 µm to 150 µm, more preferably 10 µm to 100 µm and even more preferably 10 µm to 80 µm.

[Multi-Layered Film Containing Polyamide Film]

Although the polyamide film has superior deep drawability, shrinkability and piercing strength following heat-moisture treatment, it can further contain an additional layer or layers provided the effects of the invention are not impaired. Accordingly, the present invention relates to a multi-layered film containing a polyamide film.

The stretched state of the multi-layered film can be selected corresponding to the stretched state of the polyamide film. Namely, in the case the polyamide film is a non-stretched polyamide film, the multi-layered film containing the polyamide film (the multi-layered film containing the polyamide film may also be referred to as the "multi-layered film") is a non-stretched multi-layered film. In addition, in the case the polyamide film is a stretched polyamide film, the multi-layered film is a stretched multi-layered film. An example of a method used to produce the multi-layered film is a method that comprises a step for adhering an additional layer or layers on one side or both sides of a polyamide film. There are no particular limitations on the multilayering method, examples thereof include the co-extrusion method, extrusion lamination method and dry lamination method described in Japanese Unexamined Patent Publication No. 2011-225870, and co-extrusion is preferable from the viewpoint of economic feasibility.

(Additional Layers)

There are no particular limitations on the additional layers provided the multi-layered film demonstrates the effects of a polyamide film, and examples thereof include a thermoplastic resin layer and adhesive resin layer. Here, an adhesive resin layer is suitably selected for the purpose of improving moldability and adhesion between the polyamide layer and thermoplastic resin layer.

The thermoplastic resin layer is a layer that contains a thermoplastic resin, and more specifically, is a layer composed of a thermoplastic resin or a layer composed of a thermoplastic resin composition containing a thermoplastic resin (a thermoplastic resin composition containing a thermoplastic resin may also be referred to as a "thermoplastic resin composition"). More specifically, the thermoplastic resin composition is a composition composed of a thermoplastic resin and an additive.

Examples of thermoplastic resins include nonpolar polyolefins (such as low-density polyolefins, linear, low-density polyolefins, copolymers of ethylene and α-olefins having 3 to 8 carbon atoms, propylene homopolymers or copolymers of propylene and α-olefins having 4 to 8 carbon atoms), ionomers, ethylene-acrylic acid copolymers, ethylene-vinyl acetate copolymers, ethylene-acrylate copolymers, ethylene-methacrylate copolymers, polyester and polyvinyl alcohol. Thermal plasticity may also have thermal adhesiveness. Examples of such thermoplastic resins having thermal adhesiveness include low-density polyethylene, linear, low-density polyethylene, copolymers of ethylene and α-olefins having 3 to 8 carbon atoms, ionomers, ethylene-acrylic acid copolymers, ethylene-vinyl acetate copolymers, ethylene-acrylate copolymers and ethylene-methacrylate copolymers.

The thermoplastic resin is preferably a nonpolar polyolefin, ethylene-vinyl acetate copolymer or thermoplastic resin having thermal adhesiveness. If the thermoplastic resin is a nonpolar polyolefin, water vapor impermeability of the multi-layered film tends to improve more. If the thermoplastic resin is an ethylene-vinyl acetate copolymer, oxygen gas permeability of the polyamide film tends to decrease further. In addition, if the thermoplastic resin is a thermoplastic resin having thermal adhesiveness, the thermal adhesion temperature with the covering material for deep-draw packaging can be held as low as possible in the case of using the polyamide film as a food deep-drawn packaging film, and this tends to result in more improved production efficiency.

The adhesive resin layer is a layer that contains an adhesive resin, and more specifically, is a layer composed of an adhesive resin or an adhesive resin composition containing an adhesive resin (an adhesive resin composition containing an adhesive resin may also be referred to as an "adhesive resin composition"). More specifically, the adhesive resin composition is a composition composed of an adhesive resin and additives. There are no particular limitations on the adhesive resin, and examples thereof include acid-modified polyolefin resins such as acid-modified polyethylene obtained by grafting at least one type of monomer selected from unsaturated carboxylic acids and derivatives thereof.

Examples of additives contained in the thermoplastic resin composition and adhesive resin composition include those additives previously described in the section describing the polyamide resin composition.

<Layer Composition>

Specific examples of layer compositions of the multi-layered film include two layers consisting of a polyamide film and thermoplastic resin layer, three layers consisting of a polyamide film, adhesive resin layer and thermoplastic resin layer, at least three or more layers consisting of a polyamide film, thermoplastic resin layer and one or more layers selected from the group consisting of a polyamide film, adhesive resin layer and thermoplastic resin layer, and at least four or more layers consisting of a polyamide layer, thermoplastic resin layer, adhesive resin layer and one or more layers selected from the group consisting of a polyamide film, adhesive resin layer and thermoplastic resin layer. More specifically, examples of layer compositions include a layer composition of a polyamide film, adhesive resin layer and thermoplastic resin layer in that order, a layer composition of a polyamide film, adhesive resin layer, thermoplastic resin layer, adhesive resin layer and thermoplastic resin layer in that order, and a layer composition of a thermoplastic resin layer, adhesive resin layer, polyamide film, adhesive resin layer and thermoplastic resin layer in that order. Here, the adhesive resin layer can be provided as necessary. In addition, in the case the multi-layered film is a non-stretched, deep-drawn packaging film, the multi-layered film preferably has a thermoplastic resin film for the inner layer. Here, in the multi-layered film, the layer in contact with outside air is the outer layer, while the layer that contacts the packaged article in the form of a food is the inner layer.

<Thickness>

There are no particular limitations on the thickness of the multi-layered film and can be suitably selected corresponding to the application. The thickness of each polyamide film layer in the multi-layered film is preferably 2 μm to 100 μm and preferably 5 μm to 80 μm. The thickness of each thermoplastic resin layer can be suitably selected corresponding to the application, and is preferably within the range of, for example, 8 μm to 120 μm. The thickness of each adhesive resin layer can be selected corresponding to the application and is preferably within the range of, for example, 1 μm to 100 μm. There are no particular limitations on the total film thickness of the multi-layered film, and is preferably 5 μm to 500 μm, more preferably 20 μm to 300 μm, and particularly preferably 50 μm to 200 μm.

(Polyamide Monofilament)

Examples of polyamide monofilaments containing the polyamide resin include polyamide monofilament composed of the polyamide resin and polyamide monofilament composed of the polyamide resin composition, and polyamide monofilament composed of the polyamide resin is preferable.

Although there are no particular limitations thereon, the diameter of the polyamide monofilament is preferably 0.5 mm to 2 mm and more preferably 1 mm to 5 mm.

The polyamide monofilament is obtained by a known polyamide filament production method using the polyamide resin or polyamide resin composition. An example of a polyamide filament production method consists of melting pellets of the polyamide resin with an extruder and extruding from a spinning nozzle followed by cooling with a coolant such as water or trichloroethylene to produce undrawn yarn. In this case, the distance from the filament outlet of the spinning nozzle to the coolant liquid surface is preferably maintained at about 10 mm to 300 mm.

The undrawn yarn may be further subjected to drawing and heat setting. Here, drawing is preferably two-stage drawing carried out in two stages.

The first stage of drawing of two-stage drawing preferably consists of drawing undrawn yarn by 2 to 5 times, and preferably 3 to 4 times, in steam or hot water. Knot strength tends to improve more if the draw ratio is within this range.

In the case of drawing in steam, the temperature range is preferably 95° C. to 120° C. and more preferably 100° C. to 110° C. In the case the temperature of the steam is within these ranges, knot strength and transparency of the resulting monofilament tend to improve more.

In the case of drawing in hot water, the temperature of the hot water is preferably within a temperature range of 50° C. to 95° C. and more preferably within a temperature range of 60° C. to 90° C. In the case the temperature of the hot water is within these ranges, knot strength and transparency of the resulting monofilament tend to improve more.

The second stage of drawing is preferably carried out in a gaseous atmosphere by preferably 1.1 to 2.5 times and more preferably 1.2 to 2.5 times. There are no particular limitations on the gas used, and examples thereof include an inert gas such as helium, nitrogen or argon. The temperature of the gaseous atmosphere during the second stage of drawing is preferably within a temperature range of 180° C. to 300° C. and more preferably within a temperature range of 120° C. to 250° C. In the case the aforementioned temperature ranges and draw ratios are used in the second stage of drawing, knot strength and transparency of the resulting monofilament tend to improve more.

The monofilament is preferably subjected to heat setting following two-stage drawing. Following two-stage drawing, the monofilament is allowed to relax to 0% to 10% followed by carrying out heat setting in a gaseous atmosphere preferably within a temperature range of 160° C. to 320° C. and more preferably 160° C. to 350° C. In the case of carrying out heat setting within these temperature ranges, knot strength tends to improve more.

In the aforementioned two-stage drawing and heat treatment, the overall draw ratio is preferably within the range of 4.0 to 7.0, more preferably within the range of 4.5 to 6.5 and further preferably within the range of 5.5 to 6.0.

A polyamide monofilament can be produced that demonstrates superior transparency, moldability and knot strength over a diameter of about 0.5 mm to 20 mm by producing an undrawn yarn from a polyamide and subjecting the undrawn yarn to two-stage drawing and heat treatment.

[Applications]

The polyamide resin and polyamide resin composition can be used as raw materials of molded articles. A molded article containing the polyamide resin, namely a molded article composed of the polyamide resin or a molded article composed of the polyamide resin composition, can be used in conventional applications of molded articles of polyamide resins and polyamide resin compositions, including a wide range of applications such as food packaging films, automobile members, computers and related equipment, optical equipment members, electrical and electronic equipment, telecommunication equipment, precision machinery, civil engineering and construction supplies, medical supplies or household supplies, and is particularly useful in food packaging film.

A non-stretched polyamide film is useful as the raw material of a stretched polyamide film.

The non-stretched polyamide film and non-stretched multi-layered film can be preferably used as food packaging film, and particularly deep-drawn food packaging film, due to the superior deep drawability thereof. In the case of using the non-stretched polyamide film as deep-drawn packaging film, a food is contained in a deep-drawn packaging bottom material, obtained by deep drawing and molding a film, and then packaged using a cover material. Examples of foods contained in the deep-drawn packaging bottom material include sliced foods such as ham or cheese. There are no particular limitations on the cover material, and can be suitably selected corresponding to the objective.

There are no particular limitations on the deep-draw molding method of the non-stretched polyamide film and non-stretched multi-layered film, and examples thereof include vacuum molding and compression molding. The method for packaging food using a deep-drawn packaging film comprises a step for obtaining a deep-drawn packaging bottom material by deep-draw molding using the deep-drawn packaging film, a step for containing the food therein, and a step for joining the bottom material and a cover material, and a continuous device or batch-type device can be used. There are no particular limitations on the deep-draw molding conditions, and can be selected corresponding to the film thickness and objective of use. There are no particular limitations on the molding temperature, and a temperature of 60° C. to 130° C. is preferable.

Since the stretched polyamide film and stretched multi-layered film have large hot water shrinkability and superior oxygen impermeability, they are useful as food packaging films such as food packaging shrink films or food packaging casing films for filling and packaging non-solid or semi-non-solid foods such as sausages or solid foods such as processed foods or ham.

The polyamide monofilament is useful for use as a filament in fishery, industrial, textile or medical applications and as the structure of a multifilament or net.

EXAMPLES

Although the following provides an explanation of the present invention by indicating examples and comparative examples thereof, the present invention is not limited to the following examples. The measured values shown in Tables 1 and 2 were obtained using the measurement methods indicated below.

1) Relative Viscosity: Relative viscosity was measured at 25° C. using an Ubbelohde viscometer in compliance with JIS K6810 using 96% by weight concentrated sulfuric acid for the solvent and at a polyamide resin concentration of 1% by weight.

2) Melting Point: Melting point was measured by heating the polyamide resin to 250° C. at a heating rate of 10° C./min in a nitrogen gas atmosphere using the Model DSC210 manufactured by Seiko Instruments Inc. and holding at that temperature for 10 minutes followed by cooling to 30° C. at the rate of 10° C./min followed immediately thereafter by again heating to 250° C. at the rate of 10° C./min and taking the heating temperature when the endothermic peak obtained during the course of reheating was reached to be the melting point.

3) Terminal Group Concentrations: The concentration of terminal amino groups ($-NH_2$) in the polyamide resin was measured by dissolving the polyamide resin in benzyl alcohol and titrating with 0.05 N aqueous sodium hydroxide solution, while the concentration of terminal carboxyl groups ($-COOH$) was measured by dissolving the polyamide resin in benzyl alcohol and titrating with 0.05 N aqueous sodium hydroxide solution.

4) Unit Content: The contents of Unit 1, Unit 2 and Unit 3 in the polyamide resin were measured by hydrolyzing the polyamide with hydrochloric acid followed by subjecting to esterification and iminization treatment and measuring their respective contents using gas chromatography.

5) Shrinkability (Hot Water Shrinkage): A length A (mm) in the machine direction during T-die molding of a simultaneous biaxial stretched film was measured immediately after molding, and after immersing the film for 1 minute in a water bath set to 90° C., the film was allowed to stand for 4 hours in an environment at 23° C. and 50% RH followed by measuring a length B (mm) at the same location immediately after standing and calculating hot water shrinkage in accordance with the following Equation (1).

$$\text{Hot water shrinkage (\%)} = (A-B)/A \times 100 \tag{1}$$

6) Piercing Strength: Piercing strength was measured using the Tensilon UTM-III-200 manufactured by Toyo Baldwin Co., Ltd. in compliance with JAS P1019 under conditions of a piercing speed of 50 mm/min, temperature of 23° C. and humidity of 50% RH. Measurement was carried out on a simultaneous biaxial stretched film immediately after molding and a simultaneous biaxial stretched film following heat-moisture treatment consisting of heating for 10 days in a constant temperature, constant humidity chamber at 80° C. and 90% RH.

7) Oxygen Permeability Coefficient: The oxygen permeability coefficient of a non-stretched film having a thickness of 50 μm was measured in compliance with ASTM D-3985-81 using the MOCON-OX-TRAN2/20 manufactured by Modern Controls Inc. under conditions of a temperature of 23° C. and humidity of 0% RH.

8) Draw Depth (mm): Deep-draw molding of the resulting 50 μm non-stretched film was carried out using the PLAVAC Model TV-33 vacuum molding device manufactured by Sanwa Kogyo Co., Ltd. under conditions of a deep drawing temperature of 80° C., preheating time of 120 seconds and degree of vacuum of 20 Torr. The maximum depth at which breakage did not occur during molding under the aforementioned conditions was taken to be the draw depth.

Example 1: Production of Polyamide Resin (PA-1)

15.0 kg of ε-caprolactam, 10.0 kg of an aqueous solution (50% by weight aqueous solution) of an AH salt (salt obtained by adding adipic acid to an aqueous hexamethylenediamine solution in an equimolar amount to the hexamethylenediamine), and 2.0 g of distilled water were charged into a 70 L autoclave, 9.39 g of a polymerization regulator in the form of an aqueous solution of hexamethylenediamine (80% by weight aqueous solution, to be indicated as "HMD") were added thereto, and the inside of the polymerization tank was replaced with nitrogen, followed by sealing the tank and raising the temperature to 180° C. and then raising the temperature inside the polymerization tank to 240° C. while stirring and regulating the pressure inside the polymerization tank to 17.5 kgf/cm$^2$G. Two hours after the polymerization temperature reached 240° C., the pressure inside the polymerization tank was depressurized to normal pressure over the course of about 2 hours. Following depressurization, polymerization was carried out for 1 hour in the presence of flowing nitrogen followed by carrying out decompression polymerization for 2 hours. After restoring the pressure to normal pressure by introducing nitrogen, the stirrer was stopped and polyamide was extracted in the form of strands followed by pelletization. These polyamide pellets were placed in boiling water and washed for about 12 hours while stirring followed by extracting and removing unreacted monomer and vacuum-drying for 24 hours at 100° C. The relative viscosity of the polyamide resin obtained in this manner was 4.55 and the melting point was 183° C. This polyamide resin was designated as PA-1.

Example 2: Production of Polyamide Resin (PA-2)

Polyamide resin having a relative viscosity of 4.66 and melting point of 178° C. was obtained using the same method as Example 1 with the exception of charging 14.0 kg of ε-caprolactam and 12.0 kg of aqueous AH salt solution (50% by weight aqueous solution) into a 70 L autoclave and adding 8.56 g of a polymerization regulator in the form of aqueous HMD solution. This polyamide resin was designated as PA-2.

Example 3: Production of Polyamide Resin (PA-3)

Polyamide resin having a relative viscosity of 4.06 and melting point of 176° C. was obtained using the same method as Example 1 with the exception of charging 13.0 kg of ε-caprolactam and 14.0 kg of aqueous AH salt solution (50% by weight aqueous solution) into a 70 L autoclave and adding 4.97 g of a polymerization regulator in the form of aqueous HMD solution. This polyamide resin was designated as PA-3.

Comparative Example 1: Production of Polyamide Resin (PA-4)

Polyamide resin having a relative viscosity of 4.44 and melting point of 192° C. was obtained using the same method as Example 1 with the exception of charging 16.0 kg of ε-caprolactam and 8.0 kg of aqueous AH salt solution (50% by weight aqueous solution) into a 70 L autoclave and adding 11.04 g of a polymerization regulator in the form of aqueous HMD solution. This polyamide resin was designated as PA-4.

Comparative Example 2: Production of Polyamide Resin (PA-5)

Polyamide resin having a relative viscosity of 4.02 and melting point of 192° C. was obtained using the same method as Example 1 with the exception of charging 12.0 kg of ε-caprolactam and 16.0 kg of aqueous AH salt solution (50% by weight aqueous solution) into a 70 L autoclave and adding 2.48 g of a polymerization regulator in the form of aqueous HMD solution. This polyamide resin was designated as PA-5.

Comparative Example 3: Production of Polyamide Resin (PA-6)

Polyamide resin having a relative viscosity of 4.15 and melting point of 196° C. was obtained using the same method as Example 1 with the exception of charging 16.0 kg of ε-caprolactam and 4.0 kg of 12-aminododeanoic acid into a 70 L autoclave and adding 10.5 g of a polymerization regulator in the form of aqueous HMD solution. This polyamide resin was designated as PA-6.

Comparative Example 4: Production of Polyamide Resin (PA-7)

Polyamide resin having a relative viscosity of 4.29 and melting point of 184° C. was obtained using the same method as Example 1 with the exception of charging 15.6 kg of ε-caprolactam, 4.4 kg of an aqueous solution (50% by weight aqueous solution) of an AH salt (salt obtained by adding adipic acid to an aqueous hexamethylenediamine solution in an equimolar amount to the hexamethylenediamine) and 2.2 kg of 12-aminododecanoic acid into a 70 L autoclave and adding 9.39 g of a polymerization regulator in the form of aqueous HMD solution. This polyamide resin was designated as PA-7.

Comparative Example 5: Production of Polyamide Resin (PA-8)

Polyamide resin having a relative viscosity of 4.47 and melting point of 185° C. was obtained using the same method as Example 1 with the exception of charging 15.6 kg of ε-caprolactam, 6.0 kg of an aqueous solution (50% by weight aqueous solution) of an AH salt (salt obtained by adding adipic acid to an aqueous hexamethylenediamine solution in an equimolar amount to the hexamethylenediamine) and 1.4 kg of 12-aminododecanoic acid into a 70 L autoclave and adding 6.07 g of a polymerization regulator in the form of aqueous HMD solution. This polyamide resin was designated as PA-8.

Comparative Example 6: Production of Polyamide Resin (PA-9)

Polyamide resin having a relative viscosity of 4.06 and melting point of 178° C. was obtained using the same method as Example 1 with the exception of charging 14.0 kg of ε-caprolactam and 12.0 kg of aqueous AH salt solution (50% by weight aqueous solution) into a 70 L autoclave and not using aqueous HMD solution. This polyamide resin was designated as PA-9.

Example 4: Production of Film

Single-layer non-stretched films composed of the polyamide resin (PA-1) obtained in Example 1 and having thicknesses of 50 μm and 100 μm were obtained using a T-die molding device (die width: 300 mm) manufactured by Plabor Research Laboratory of Plastics Technology Co., Ltd. under conditions of a molding temperature of 250° C., first cooling roller temperature of 30° C. and second cooling roller temperature of 27° C. The resulting 100 μm thick, single-layer non-stretched film was cut to a length of 92 mm and width of 92 mm followed by installing in the stretching tank of the Model BIX-703 biaxial stretching machine adjusted to a temperature of 100° C. and preheating for 60 seconds at 100° C. followed by stretching by 3.0 times or 3.4 times in the two directions of the extruding direction and direction perpendicular thereto during T-die molding at a deformation velocity of 150 min/sec, and then carrying out heat treatment for 1 minute with hot air at 100° C. to obtain simultaneous biaxial stretched films. Shrinkability and piercing strength were measured using the simultaneous biaxial stretched film obtained from the 100 μm thick non-stretched film. In addition, oxygen permeability coefficient was measured using the 50 μm thick non-stretched film.

Examples 5-6 and Comparative Examples 7-12

A non-stretched film and simultaneous biaxial stretched film were obtained using the same method as Example 4 with the exception of using the polyamide resins shown in Table 2 instead of polyamide resin (PA-1). Similar to Example 4, shrinkability and piercing strength were measured using the simultaneous biaxial stretched film, while oxygen permeability coefficient was measured using the non-stretched film.

The results are summarized in Tables 1 and 2. Furthermore, in Examples 1 to 3, Comparative Examples 1 and 2, and Comparative Examples 4 to 6, the content of Unit 1 was determined based on the total amount of Unit 1, Unit 2 and Unit 3. On the other hand, this was not determined in Comparative Example 3 since Unit 1, Unit 2 and Unit 3 were not contained.

TABLE 1

|  |  |  |  | Example 1 PA-1 | Example 2 PA-2 | Example 3 PA-3 | Comparative Example 1 PA-4 | Comparative Example 2 PA-5 |
|---|---|---|---|---|---|---|---|---|
| Charged Amount*[1] | ε-Caprolactam | | kg | 15.0 | 14.0 | 13.0 | 16.0 | 12.0 |
| | AH salt (50 wt % aqueous solution) | | kg | 10.0 | 12.0 | 14.0 | 8.0 | 16.0 |
| | 12-aminododecanoic acid | | kg | | | | | |
| | Aqueous HMD solution (80 wt % aqueous solution) | | | 9.39 | 8.56 | 4.97 | 11.04 | 2.48 |
| Polyamide Resin | Composition | PA6 6 | wt % | 75 | 70 | 65 | 80 | 60 |
| | | PA66 66 | wt % | 25 | 30 | 35 | 20 | 40 |
| | | PA12 12 | wt % | | | | | |
| | Unit 1 content based on total amount of Units 1, 2, 3 (wt %) | | | 75 | 70 | 65 | 80 | 60 |
| | Relative viscosity | | — | 4.55 | 4.66 | 4.06 | 4.44 | 4.02 |
| | Melting point | | °C. | 183 | 178 | 176 | 192 | 173 |
| | Terminal group concentrations | —NH$_2$ H$_2$ | ×10$^{-5}$ eq/g | 2.77 | 2.56 | 2.93 | 2.8 | 2.91 |
| | | —COOH OOH | ×10$^{-5}$ eq/g | 2.43 | 2.25 | 2.75 | 2.4 | 2.82 |

|  |  |  |  | Comparative Example 3 PA-6 | Comparative Example 4 PA-7 | Comparative Example 5 PA-8 | Comparative Example 6 PA-9 |
|---|---|---|---|---|---|---|---|
| Charged Amount*[1] | ε-Caprolactam | | kg | 16.0 | 15.6 | 15.6 | 14.0 |
| | AH salt (50 wt % aqueous solution) | | kg | | 4.4 | 6.0 | 12.0 |
| | 12-aminododecanoic acid | | kg | 4.0 | 2.2 | 1.4 | |
| | Aqueous HMD solution (80 wt % aqueous solution) | | | | 10.5 | 9.39 | 6.07 |
| Polyamide Resin | Composition | PA6 6 | wt % | 80 | 78 | 78 | 70 |
| | | PA66 66 | wt % | | 11 | 15 | 30 |
| | | PA12 12 | wt % | 20 | 11 | 7 | |
| | Unit 1 content based on total amount of Units 1, 2, 3 (wt %) | | | —*[2] | 88 | 84 | 70 |
| | Relative viscosity | | — | 4.15 | 4.29 | 4.47 | 4.03 |
| | Melting point | | °C. | 196 | 184 | 185 | 178 |
| | Terminal group concentrations | —NH$_2$ H$_2$ | ×10$^{-5}$ eq/g | 2.8 | 2.88 | 2.83 | 2.98 |
| | | —COOH OOH | ×10$^{-5}$ eq/g | 2.42 | 2.54 | 2.61 | 3.70 |

*[1]The charged amount during polymerization refers to the amount charged into a 70 L batch-type polymerization tank
*[2]Not determined due to absence of Units 1, 2 and 3

TABLE 2

|  | Polyamide resin used | | | Example 4 PA-1 | Example 5 PA-2 | Example 6 PA-3 | Comparative Example 7 PA-4 | Comparative Example 8 PA-5 |
|---|---|---|---|---|---|---|---|---|
| Polyamide film | | Draw ratio | | | | 3.0 × 3.0 | | |
| | Shrinkability | Hot water shrinkabilily, 90° C. 1 min | % | 42 | 47 | 50 | 36 | 52 |
| | | Piercing strength | N | 15 | 15 | 13 | 14 | 10 |
| | Piercing strength, heat-moisture treatment, 80° C., 10 days | | | 14 | 14 | 12 | 13 | 9 |
| | | Draw ratio | | | | 3.4 × 3.4 | | |

TABLE 2-continued

|  |  |  |  |  |  |  |  |
|---|---|---|---|---|---|---|---|
| Shrinkability | Hot water Shrinkability, 90° C., 1 min | % | 42 | 50 | 53 | 36 | 52 |
|  | Piercing strength | N | 15 | 15 | 13 | 15 | 10 |
|  | Draw ratio |  |  |  | Non-stretched |  |  |
| Oxygen permeability coefficient |  | cc/m$^2$ · day · atm | 27 | 26 | 28 | 26 | 31 |
| Deep drawability |  | mm | 60.0 | 70.0 | 72.5 | 50.0 | 75.0 |

|  |  |  |  | Comparative Example 9 PA-6 | Comparative Example 10 PA-7 | Comparative Example 11 PA-8 | Comparative Example 12 PA-9 |
|---|---|---|---|---|---|---|---|
|  | Polyamide resin used |  |  |  |  |  |  |
| Polyamide film | Draw ratio |  |  |  | 3.0 × 3.0 |  |  |
|  | Shrinkability | Hot water shrinkabilily, 90° C. 1 min | % | 33 | 41 | 41 | 47 |
|  |  | Piercing strength | N | 15 | 15 | 15 | 14 |
|  | Piercing strength, heat-moisture treatment, 80° C., 10 days |  |  | 14 | 14 | 14 | 11 |
|  | Draw ratio |  |  |  | 3.4 × 3.4 |  |  |
|  | Shrinkability | Hot water Shrinkability, 90° C., 1 min | % | 36 | 40 | 40 | 50 |
|  |  | Piercing strength | N | 13 | 15 | 15 | 14 |
|  | Draw ratio |  |  |  | Non-stretched |  |  |
| Oxygen permeability coefficient |  | cc/m$^2$ · day · atm | 80 | 44 | 38 | 27 |
| Deep drawability |  | mm | 52.5 | 55.0 | 60.0 | 70.0 |

The polyamide films of Examples 4 to 6 demonstrated favorable shrinkability, piercing strength after heat treatment and deep drawability. On the other hand, the polyamide films of Comparative Examples 7 to 12 demonstrated unfavorable trends with respect to any of the parameters of shrinkability, piercing strength after heat treatment and deep drawability. Specific results were as indicated below.

Comparative Example 7 is a polyamide film obtained by using the polyamide resin of Comparative Example 1. Since the amount of Unit 1 in the polyamide resin of Comparative Example 1 is 80% by weight, the polyamide film of Comparative Example 7 demonstrated inferior shrinkability and deep drawability.

Comparative Example 8 is a polyamide film obtained using the polyamide resin of Comparative Example 2. Since the amount of Unit 1 in the polyamide resin of Comparative Example 2 is 60% by weight, piercing strength (and particularly piercing strength after heat treatment) was inferior.

Comparative Example 9 is a polyamide film obtained using the polyamide resin of Comparative Example 3. Since the polyamide resin of Comparative Example 3 does not contain Unit 2 or Unit 3, shrinkability was particularly inferior.

Comparative Examples 10 and 11 are polyamide films obtained using the polyamide resins of Comparative Examples 4 and 5. Since the amount of Unit 1 in the polyamide resin of Comparative Example 4 is 80% by weight, the polyamide film of Comparative Example 10 demonstrated inferior shrinkability and deep drawability. Similarly, the polyamide film of Comparative Example 11 also demonstrated inferior shrinkability. In addition, since the polyamide resins of Comparative Examples 4 and 5 contain a unit derived from 12-aminododecanoic acid, the polyamide films of Comparative Examples 10 and 11 demonstrated higher oxygen permeability coefficients in comparison with the polyamide films of Examples 4 to 6 obtained using polyamide resins not containing a unit derived from 12-aminododecanoic acid.

Comparative Example 12 is a polyamide film obtained using the polyamide resin of Comparative Example 6. Here, in the polyamide resin of Comparative Example 6, the concentration of terminal amino groups of the polyamide resin is equal to or less than the concentration of terminal carboxyl groups of the polyamide resin. Consequently, the polyamide film of Comparative Example 12 demonstrated inferior piercing strength relative to Example 5 in which was used the polyamide resin of Example 2 in which the contents of Units 1 to 3 are the same.

The measured values shown in Tables 4 and 5 were obtained using the measurement methods indicated below.

9) Knot Strength: The Tensilon Universal Material Tester Model RTA-10KN was used for the tensile tester. A knot was formed in a single monofilament and both ends thereof were attached to the chuck units of the universal tester. Tensile strength was evaluated at a speed of 200 mm/min in an environment controlled to a temperature of 23° C. and humidity of 50% RH. Strength units were expressed in cN/dTex. Weight was measured every 5 m to calculate cross-sectional surface area, and this was then converted to weight per 1000 m (Tex) and used to calculate strength.

10) Moldability: After molding a monofilament, roundness, absence of monofilament internal air bubbles and breakage during drawing were used as indicators to evaluate moldability of the monofilament by evaluating the occurrence of breakage with × and evaluating the absence of breakage with ○.

11) Transparency: A monofilament was placed on a piece of black paper having white lines drawn thereon followed by visually examining the monofilament and evaluating the quality of transparency in the manner indicated below.

◯: White lines clearly visible through the monofilament
Δ: Contours of white lines appear indistinctly through the monofilament
X: Contours of white lines not visible through the monofilament Comparative Example 13: Production of Polyamide Resin (PA-10)

20.0 kg of ε-caprolactam were charged into a 70 L autoclave followed by carrying out the same method as Example 1 to obtain a polyamide resin having a relative viscosity of 4.05 and melting point of 220° C. This polyamide resin was designated as PA-10.

Example 7: Production of Monofilament

Pellets of polyamide resin PA-2 obtained in a 70 L autoclave were melted with a single-screw extruder and extruded into a water bath set to 15° C. using the extruder at a die set temperature of 260° C. and opening size of 6 mm followed by solidifying by cooling. The monofilament was drawn by 4 times by heating with steam at 100° C. during the first drawing stage. Continuing, the monofilament was drawn by 2 times by heating with hot air at 200° C. in the second drawing stage. Subsequently, hot setting was carried out with hot air at 250° C. followed by allowing to relax by about 5% to obtain a monofilament sample. The diameter of the resulting monofilament was 2.0 mm. The resulting monofilament was then used to evaluate moldability, knot strength and transparency.

Example 8 and Comparative Examples 14-16

Monofilaments having a diameter of 2 mm were obtained using the same method as Example 7 with the exception of using the polyamide resins shown in Table 4 instead of polyamide resin (PA-2). Knot strength, transparency and moldability were measured in the same manner as Example 7.

Examples 9-10 and Comparative Examples 17-19

Monofilaments having a diameter of 3 mm were obtained using the same method as Example 7 with the exception of using the polyamide resins shown in Table 5 having a die opening of 10 mm instead of polyamide resin (PA-2). Knot strength, transparency and moldability were measured in the same manner as Example 7.

The results are summarized in Tables 3, 4 and 5.

TABLE 3

|  |  |  | Comparative Example 13 PA-10 |
|---|---|---|---|
| Charged amount*[1] | ε-Caprolactam | kg | 24.0 |
|  | AH salt (50 wt % aqueous solution) | kg |  |
|  | 12-aminododecanoic acid | kg |  |
|  | Aqueous HMD solution (80 wt % aqueous solution) | g | 0 |
| Polyamide resin | Composition PA6 | wt % | 100 |
|  | PA66 | wt % | — |
|  | PA12 | wt % | — |
|  | Unit 1 content based on total amount of Units 1, 2, 3 (wt %) |  | —*[2] |
|  | Relative viscosity | — | 4.05 |
|  | Melting point | ° C. | 220 |
|  | Terminal group concentrations —$NH_2$ | ×$10^{-5}$ eq/g | 4.15 |
|  | —COOH | ×$10^{-5}$ eq/g | 3.70 |

*[1]The charged amount during polymerization refers to the amount charged into a 70 L batch-type polymerization tank
*[2]Not determined due to absence of Units 1, 2 and 3

TABLE 4

|  |  | Diameter of the monofilament: 2 mm | | | | |
|---|---|---|---|---|---|---|
|  |  | Example 7 | Example 8 | Comparative Example 14 | Comparative Example 15 | Comparative Example 16 |
| Polyamide resin used |  | PA-2 | PA-1 | PA-4 | PA-6 | PA-10 |
| Knot strength | cN/dTex | 4.5 | 4.3 | 3.6 | 4.1 | — |
| Transparency | — | ◯ | ◯ | Δ | ◯ | x |
| Moldability | — | ◯ | ◯ | ◯ | ◯ | x |

TABLE 5

|  |  | Diameter of the monofilament: 3 mm | | | | |
|---|---|---|---|---|---|---|
|  |  | Example 9 | Example 10 | Comparative Example 17 | Comparative Example 18 | Comparative Example 19 |
| Polyamide resin used |  | PA-2 | PA-1 | PA-4 | PA-6 | PA-10 |
| Knot strength | cN/dTex | 4.4 | 3.0 | 1.8 | 1.7 | — |
| Transparency | — | ◯ | ◯ | Δ | ◯ | x |
| Moldability | — | ◯ | ◯ | ◯ | ◯ | x |

The polyamide monofilaments of Examples 7 to 10 demonstrated favorable knot strength, transparency and moldability relative to Comparative Examples 15 to 20 having the same diameter. On the other hand, the polyamide monofilaments of Comparative Examples 7 to 12 demonstrated unfavorable trends with respect to any of the parameters of knot strength, transparency and moldability. Specific results were as indicated below.

Comparative Examples 14 and 17 are polyamide monofilaments obtained using the polyamide resin of Comparative Example 1. Since the amount of Unit 1 in the polyamide resin of Comparative Example 1 is 80% by weight, the polyamide monofilaments of Comparative Examples 14 and 17 demonstrated inferior knot strength and transparency.

Comparative Examples 15 and 18 are polyamide monofilaments obtained using the polyamide resin of Comparative Example 3. Since the polyamide resin of Comparative Example 3 does not contain Unit 2 or Unit 3, the polyamide monofilaments of Comparative Examples 15 and 18 demonstrated particularly inferior knot strength.

Comparative Examples 16 and 19 are polyamide monofilaments obtained using the polyamide resin of Comparative Example 13. Since the polyamide resin of Comparative Example 13 is only composed of Unit 1, the polyamide monofilaments of Comparative Examples 16 and 19 demonstrated inferior transparency and even more inferior moldability. In particular, knot strength was unable to be measured for the polyamide monofilaments of Comparative Examples 16 and 19 due to the inferior moldability thereof.

INDUSTRIAL APPLICABILITY

According to the present invention, a polyamide resin that imparts a molded article having more superior film shrinkability, piercing strength following heat-moisture treatment and deep drawability, as well as superior monofilament knot strength, transparency, tensile strength following heat-moisture treatment and moldability, along with a molded article using the same, are provided. A molded article composed of the polyamide resin composition of the present invention can be used in conventional applications of molded articles composed of polyamide resin compositions, can be used in automobile members, computers and related equipment, optical equipment members, electrical and electronic equipment, telecommunication equipment, precision machinery, civil engineering and construction supplies, medical supplies, household supplies and a wide range of other molded article applications, and is particularly useful in food packaging film and filament applications.

The invention claimed is:

1. A polyamide resin consisting of a unit derived from ε-caprolactam and/or ε-aminocaproic acid (to also be referred to as "Unit 1"), a unit derived from adipic acid (to also be referred to as "Unit 2") and a unit derived from hexamethylenediamine (to also be referred to as "Unit 3"), wherein the concentration of terminal amino groups in the polyamide resin is greater than the concentration of terminal carboxyl groups in the polyamide resin, and the amount of Unit 1 is greater than 60% by weight to less than 80% by weight of the total amount of Unit 1, Unit 2 and Unit 3, and wherein the polyamide resin has the following features (1) and (2):
  (1) relative viscosity ($\eta r$) of the polyamide resin measured in 96% by weight of sulfuric acid under conditions of a polyamide concentration of 1% by weight and temperatures of 25° C. is 3.4 or more; and
  (2) the concentration of terminal carboxyl groups in the polyamide resin is $2.00 \times 10^{-5}$ eq/g to $3.00 \times 10^{-5}$ eq/g, provided that the concentration of terminal amino groups in the polyamide resin is greater than the concentration of terminal carboxyl groups in the polyamide resin.

2. The polyamide resin according to claim 1, wherein the concentration of terminal amino groups is $2.30 \times 10^{-5}$ eq/g to $3.30 \times 10^{-5}$ eq/g, provided that the concentration of terminal amino groups in the polyamide resin is greater than the concentration of terminal carboxyl groups in the polyamide resin.

3. The polyamide resin according to claim 1, wherein the difference between the concentration of terminal amino groups and the concentration of terminal carboxyl groups is $0.05 \times 10^{-5}$ eq/g to $1.0 \times 10^{-5}$ eq/g.

4. A molded article comprising:
  a) the polyamide resin according to claim 1, or
  b) a polyamide resin composition comprising the polyamide resin according to claim 1.

5. A non-stretched polyamide film comprising:
  a) the polyamide resin according to claim 1, or
  b) a polyamide resin composition comprising the polyamide resin according to claim 1.

6. A stretched polyamide film obtained by stretching the non-stretched film according to claim 5.

7. The non-stretched polyamide film according to claim 5, which is a food packaging film.

8. The stretched polyamide film according to claim 6, which is a food packaging film.

9. A multi-layered film comprising the non-stretched polyamide film according to claim 5.

10. A multi-layered film comprising the stretched polyamide film according to claim 6.

11. A polyamide monofilament comprising:
  a) the polyamide resin according to claim 1, or
  b) a polyamide resin composition comprising the polyamide resin according to claim 1.

12. A polyamide resin composition comprising the polyamide resin according to claim 1.

* * * * *